(12) United States Patent
Mensah

(10) Patent No.: US 8,511,409 B2
(45) Date of Patent: Aug. 20, 2013

(54) COMPRESSED AIR POWERED VEHICLE

(76) Inventor: Rexford David Mensah, Collingdale, PA (US)

(*) Notice: Subject to any disclaimer, the term of this patent is extended or adjusted under 35 U.S.C. 154(b) by 179 days.

(21) Appl. No.: 12/821,548

(22) Filed: Jun. 23, 2010

(65) Prior Publication Data

US 2010/0326749 A1    Dec. 30, 2010

Related U.S. Application Data

(60) Provisional application No. 61/274,121, filed on Jun. 24, 2009.

(51) Int. Cl.
*B60K 1/00*          (2006.01)

(52) U.S. Cl.
USPC .................. 180/65.31; 180/165; 180/65.1

(58) Field of Classification Search
USPC ............ 180/65.31, 165, 65.1; 290/44, 45
See application file for complete search history.

(56) References Cited

U.S. PATENT DOCUMENTS

| 4,163,367 | A | * | 8/1979 | Yeh ................................ 60/414 |
| 4,370,857 | A | * | 2/1983 | Miller ............................ 60/413 |
| 5,852,846 | A | * | 12/1998 | Gonzalez ....................... 15/313 |
| 2009/0301796 | A1 | * | 12/2009 | Wedderburn et al. .......... 180/2.2 |

* cited by examiner

*Primary Examiner* — J. Allen Shriver, II
*Assistant Examiner* — Erez Gurari
(74) *Attorney, Agent, or Firm* — Eckert Seamans Cherin & Mellott, LLC; David C. Jenkins

(57) ABSTRACT

A pressurized air system is provided. The air system includes a compressed air tank, a turbine coupled to, and in fluid communication with, the compressed air tank and structured to convert mechanical energy, an electric motor, the electric motor coupled to and in electrical communication with the turbine and having an output shaft, an electrical compressor structured to compress air, the electrical compressor coupled to and in electrical communication with the turbine, the electrical compressor also coupled to, and in fluid communication with the compressed air tank. Wherein the turbine receives compressed air from the tank and the turbine generates electricity. Further, a portion of the electricity is directed to the motor and the remaining electricity is directed to the electrical compressor, and, whereby the electrical compressor provides compressed air to the compressed air tank.

19 Claims, 1 Drawing Sheet

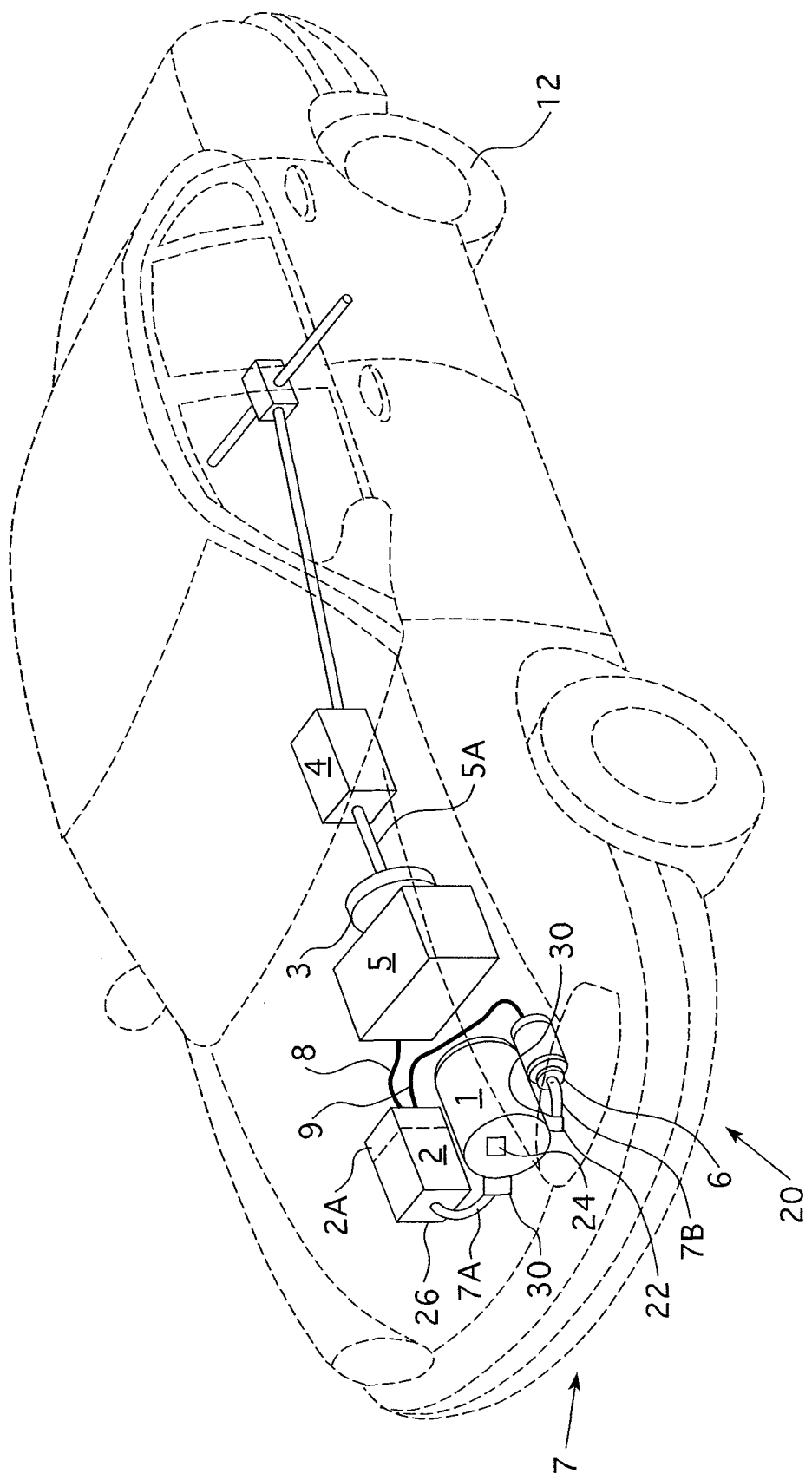

COMPRESSED AIR POWERED VEHICLE

CROSS REFERENCE TO RELATED APPLICATION

This application claims priority under 35 U.S.C. §119(e) to U.S. Provisional Patent Application Ser. No. 61/274,121, filed Jun. 24, 2009, entitled BORTI-AIR.

BACKGROUND OF THE INVENTION

1. Field of the Invention

The disclosed and claimed concept relates to a compressed air powered vehicle and, more specifically to a compressed air powered vehicle having a regenerative pressurized air supply.

2. Background Information

Presently, electric vehicles systems depend on the motion state of the vehicle to produce electricity. That is, the elements that recapture energy are operatively coupled to the transmission, or another component, i.e. the wheels, that are "downstream" in the power train. When the vehicle is not in motion, no power is generated so the supporting batteries run out of power. They can only travel short distances and only work on smaller cars. Further, a typical compressed air engine applies compressed air directly to the piston thus (1) causing the air tank to run out of air fast, (2) are unable to travel long distances and (3) works only on small cars.

Further, in recent times, energy shortages and the imposition of stricter environmental standards have created an increased awareness that a genuine need exists to find an alternative power source for the generation of electricity which does not require the use of fossil fuel, thus protecting our environment. This view has been reinforced by the fact that more and more people are realizing that the supply of organic-based fuel is finite in quantity and currently predicted to be depleted during the middle to latter part of the $21^{st}$ century.

The disclosed and claimed concept is a self contained, electrical generating system that would provide a means of producing energy to power, for instance, a tractor trailer without requiring the use of fossil fuels or an outside power source. Specifically, the disclosed and claimed concept would be powered by compressed air.

SUMMARY OF INVENTION

The disclosed and claimed concept is an electrical power generating system that would generate electrical power for vehicles using compressed air. The design is intended to provide a self contained electrical energy generating system that would not require the use of fossil fuel or an outside power source. Specifically, the system would be powered by compressed air and used to produce electricity. Once electricity is produced, part of the electricity is redirected to a compressor that continues refilling the air tank while the vehicle is in motion. With the disclosed and claimed concept, the air tank and its self supply power system produces energy whether the vehicle is in motion or not.

Generally, the air compressor provides transformed energy by the process converting the air power into electrical energy, via a turbine. This electrical energy is then supplied to a drive motor where the electrical energy is transformed into mechanical energy used to drive the transmission and wheels. Further, the rotational motion of the drive shaft is converted into electrical energy again. This energy, as well as excess energy from the turbine are used to power a compressor that provides compressed air to the tank. Basically, three transformations of energy have occurred to produce an electrical output that could be applied to a load.

For a car, for instance, this will be an onboard energy system comprised of compressed air tank/tanks, a generator, fly wheel, transmission, shaft, electrical cables and air lines. This electrical energy is then supplied to a drive motor/engine where the electrical energy is transformed into mechanical energy. The motor drive shaft transforms the mechanical energy into electrical energy again.

In an alternate embodiment, compressed air is released to make the turbine spin to produce electricity. In this embodiment, however, the onboard generated energy is supplied directly to the type of electrical engines currently in use today. However, more space would have to be created to accommodate the new compressed air system.

The disclosed and claimed concept can be used with the aid of a battery. In either case, compressed air is released to turn the turbine which in turn produces electricity as the main source of energy to move the vehicle.

BRIEF DESCRIPTION OF THE DRAWINGS

A full understanding of the disclosed concept can be gained from the following description of the preferred embodiments when read in conjunction with the accompanying drawings in which:

FIG. 1 is a schematic, isometric view of an air powered vehicle.

DESCRIPTION OF THE PREFERRED EMBODIMENTS

As used herein, a "generator" includes a turbine and an alternator or other devices that convert mechanical motion, typically rotational motion, to an electric current.

The exemplary vehicle disclosed herein is an automobile. The vehicle may, however, be any type of vehicle and the claims are not limited to an automobile.

As shown in FIG. 1, a compressed air powered vehicle 10 utilizes a regenerative pressurized air supply system 20 to provide power to the vehicle 10. The vehicle 10, an automobile 11 shown for example, includes various standard systems, e.g. control systems, a cabin, safety systems, lights, etc., that are not relevant to the disclosed concept, as well as a pair of drive wheels 12. The regenerative pressurized air supply system 20 includes the following components: a compressed air tank 1, a turbine 2, an electrical motor 5, a flywheel 3, a transmission 4, a compressor 6, an air hose system 7 and an electrical system 8. Various components are described below as being "coupled and in fluid communication." It is understood that the air hose system 7 includes a plurality of hoses including at least a first and second hose 7A, 7B structured to contain pressurized air and to provide a conduit for the pressurized air between the various components. That is, even if not specifically noted, the air hose system 7, and more specifically the individual air hoses 7A, 7B, provides the structure whereby the various components are "coupled and in fluid communication." Similarly, various components are described below as being "coupled and in electrical communication." It is understood that the electrical system 8 includes a plurality of electrical conductors 8A, such as but not limited to, wires, bus bars, etc. For example, a cable 9 electrically couples the turbine 2 and the compressor 6. As is known, and even if not specifically noted, the electrical system 8 is structured to conduct electricity between components as is known. Further, both the air hose system 7 and the electrical system 8 include known safety features. For example, all high pressure hoses 7A, 7B are restrained and conductors 8A are insulated or otherwise protected.

The compressed air tank 1 is structured to contain a gas, typically air, at an increased pressure. While not relevant to this invention, it is understood that the compressed air tank 1 has known safety features such as, but not limited to, a relief valve and/or a burst disk. The compressed air tank 1 has at least one, and preferably two, inlets 22, 24, and at least one outlet 26. As is known, each inlet and outlet 22, 24, 26 may, and preferably does, include a valve 30. The first inlet 24 is structured to be coupled to, and in fluid communication with, the compressor 6. More specifically, the first inlet 24 is structured to be coupled to, and in fluid communication with the first hose 7A which is, in turn, coupled to and in fluid communication with, the compressor 6. The second inlet 24 is, preferably, disposed in an accessible location and is structured to be temporarily coupled to, and in fluid communication with, an external compressed air source, not shown. The external source may be another tank of compressed air, typically a much larger tank, or an external compressor (not shown). The outlet 26 is coupled to and in fluid communication with the turbine 2. More specifically, the outlet 26 is structured to be coupled to, and in fluid communication with the second hose 7B which is, in turn, coupled to and in fluid communication with, the turbine 2.

The turbine 2 is structured to convert rotational energy into electrical energy. That is, the turbine 2 is a rotary engine that extracts energy from a fluid flow and converts it into electricity. The turbine 2 has a rotor assembly (not shown), which is a shaft or drum, with blades attached, that is rotatably mounted in a housing (shown schematically). The blades are structured to be actuated by a moving fluid so that they move and impart rotational energy to the rotor. The turbine 2 includes a generator 2A structured to generate electricity. That is, the generator 2A converts the mechanical rotation in the turbine 2 into electricity, as is known. The compressed air from the compressed air tank 1 is passed to the turbine 2 via a first hose 7A of the air hose system 7. The force of air passing through the turbine 2 and released through nozzles (not shown) within the turbine 2 causes the turbine 2 to spin thereby causing the generator 2A to generate electricity. The turbine 2, and more specifically the generator, 2A is structured to provide a portion of any electricity generated to either, or both, the motor 5 and the compressor 6. The turbine 2, and more specifically the generator, 2A is coupled to, and in electrical communication with, the motor 5 and the compressor 6 via the electrical system 8. It is noted that if the vehicle is at rest, the turbine 2 is structured to provide electricity only to the compressor 6.

The motor 5 is an electrical motor structured to convert electrical energy into rotational motion, as is known. The motor 5 is coupled to, and in electrical communication with, the turbine generator 2A. The motor 5 includes an output shaft 5A that rotates. The flywheel 3 is coupled to the motor output shaft 5A and rotates therewith. The flywheel 3 has a significant mass, i.e. the flywheel 3 is heavy, and once it is rotating, inertia keeps the flywheel 3 rotating. The motor output shaft 5A is further coupled to the transmission 4. As is known, the transmission 4 is operatively coupled to the drive wheels 12. That is, "operatively coupled" means the transmission 4 is structured to transfer the rotational energy of the motor output shaft 5A to the drive wheels 12, if the vehicle 10 is an automobile 11, or other output device. Further, and as is known, a controller (not shown), typically an accelerator, is used to determine the amount of energy that is directed to the transmission 4.

The compressor 6 is an electrical compressor 6. That is, the compressor 6 converts electrical energy into mechanical energy wherein the mechanical energy is used to generate compressed air. The compressor 6 has a fluid outlet 28 that is coupled to, and in fluid communication with the compressed air tank 1 via the hose system 7. More specifically, the compressor 6 is structured to deliver compressed air to the compressed air tank 1 via the hose system second hose 7B. Alternatively, the compressor 6 may be directly coupled to, and in fluid communication with, the compressed air tank 1.

In operation, compressed air is released from the compressed air tank 1 and delivered to the turbine 2 via at least one hose 7A of the air hose system 7. The compressed air powers the turbine 2 which converts the mechanical energy to electricity. The electricity thus produced is conducted via the electrical system 8 to the motor 5 as well as the compressor 6. That is, the current to the compressor 6 through the electrical cable 9 maintains the compressor 6 in operation so as to provide a constant and sufficient amount of compressed air to the compressed air tank 1. Further, current delivered to the motor 5 through the electrical cable 9A energizes the motor 5 and causes the flywheel to 3 spin. Once the flywheel 3 is spinning, and because it is connected to the transmission 4, the spinning will be passed on to the wheels for motion. It is noted that, because the turbine 2 is not directly powering the transmission 4, the turbine 2 may operate a substantially constant speed.

Moreover, during operation, the turbine 2 operates at a consistent level or speed. When the user desires the vehicle 10 to move, a portion of the electricity generated by the turbine generator 2A is directed to the motor 5 which is, in turn, coupled to the wheels, and the remaining electricity is directed to the compressor 6. Conversely, when the vehicle 10 is not being accelerated, e.g. is at rest, rolling downhill, etc., energy from the turbine 2 is directed to the compressor 6. In this configuration, the compressor 6 is, essentially, in a constant state of refilling the compressed air tank 1. Air from the compressed air tank 1 may then be used to further provide energy to the turbine 2. Thus, other than a minimal loss of energy due to friction, the pressurized air supply system 20 acts as a regenerative source of energy.

The above explains the mechanism for motor vehicles, however modifications could be made for use on air planes, trains, ships, hovercrafts, and electricity production for industrial and private use. While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. A pressurized air system comprising:
a compressed air tank;
an air hose system having a plurality of air hoses, including a first hose and second hose each coupled to, and in fluid communication with, said compressed air tank;
a turbine coupled to, and in fluid communication with said first air hose structured to convert mechanical energy, generated by said compressed air passing through said turbine, into electricity;
an electric motor, said electric motor coupled to and in electrical communication with said turbine, said motor having an output shaft;

an electrical compressor structured to compress air, said electrical compressor coupled to and in electrical communication with said turbine, said electrical compressor also coupled to, and in fluid communication with, said second hose, wherein said compressor structured to deliver compressed air to said compressed air tank;

wherein said turbine receives compressed air from said tank and said turbine generates electricity;

wherein a portion of said electricity is directed to said motor and the remaining electricity is directed to said electrical compressor; and whereby said electrical compressor provides a constant supply of compressed air to said compressed air tank.

2. The pressurized air system of claim 1 wherein said turbine operates a substantially constant speed.

3. The pressurized air system of claim 1 wherein said turbine includes a generator, said generator coupled to, and in electrical communication with said motor.

4. The pressurized air system of claim 1 further including a flywheel, said flywheel coupled to said motor output shaft.

5. The pressurized air system of claim 1 wherein:
said turbine include a generator; and
said turbine generator structured to generate electricity.

6. The pressurized air system of claim 1 wherein:
said compressed air tank includes at least one inlet and one outlet;
said compressed air tank at least one inlet coupled to, and in fluid communication with said first hose; and
said compressed air tank outlet coupled to, and in fluid communication with said second hose.

7. The pressurized air system of claim 1 wherein:
said at least one inlet includes a valve; and
said at least one outlet includes a valve.

8. The pressurized air system of claim 1 further including:
an electrical system having a plurality of electrical conductors including a cable; and
said cable coupling, and providing electrical communication between, the turbine and the compressor.

9. A pressurized air vehicle comprising:
a compressed air tank;
an air hose system having a plurality of air hoses, including a first hose and second hose each coupled to, and in fluid communication with, said compressed air tank;
a turbine coupled to, and in fluid communication with said first air hose structured to convert mechanical energy, generated by said compressed air, into electricity;
an electric motor, said electric motor coupled to and in electrical communication with said turbine, said motor having an output shaft;
an electrical compressor structured to compress air, said electrical compressor coupled to and in electrical communication with said turbine, said electrical compressor also coupled to, in fluid communication with, said second hose, wherein said compressor structured to deliver compressed air to said compressed air tank;
a transmission, structured to convert the rotational motion of a motor output shaft into rotational motion for a set of drive wheels;
a set of drive wheels coupled to said transmission;
said motor having an output shaft;
said transmission coupled to said motor output shaft;
wherein said turbine receives compressed air from said tank and said turbine generates electricity;
wherein a portion of said electricity is directed to said motor and the remaining electricity is directed to said electrical compressor; and whereby said electrical compressor provides a constant supply of compressed air to said compressed air tank.

10. The pressurized air vehicle of claim 9 wherein said turbine operates a substantially constant speed.

11. The pressurized air vehicle of claim 9 wherein said turbine includes a generator, said generator coupled to, and in electrical communication with said motor.

12. The pressurized air vehicle of claim 9 further including a flywheel, said flywheel coupled to said motor output shaft.

13. The pressurized air vehicle of claim 9 wherein:
said turbine include a generator; and
said turbine generator structured to generate electricity.

14. The pressurized air vehicle of claim 9 wherein:
said compressed air tank includes at least one inlet and one outlet;
said compressed air tank at least one inlet coupled to, and in fluid communication with said first hose; and
said compressed air tank outlet coupled to, and in fluid communication with said second hose.

15. The pressurized air vehicle of claim 9 wherein:
said at least one inlet includes a valve; and
said at least one outlet includes a valve.

16. The pressurized air vehicle of claim 9 further including:
an electrical system having a plurality of electrical conductors including a cable; and
said cable coupling, and providing electrical communication between, the turbine and the compressor.

17. The pressurized air vehicle of claim 9 further including:
a transmission, said transmission coupled to said motor output shaft; and
a pair of drive wheels, said drive wheels operatively coupled to said transmission.

18. The pressurized air vehicle of claim 9 wherein said turbine is structured to provide a portion of any electricity generated to both said motor and said compressor.

19. The pressurized air vehicle of claim 9 wherein, if said vehicle is at rest, said turbine is structured to provide electricity only to said compressor.

* * * * *